Aug. 20, 1929.  F. G. LILJENROTH  1,725,462
METHOD OF OXIDIZING AMMONIA
Filed Jan. 11, 1926
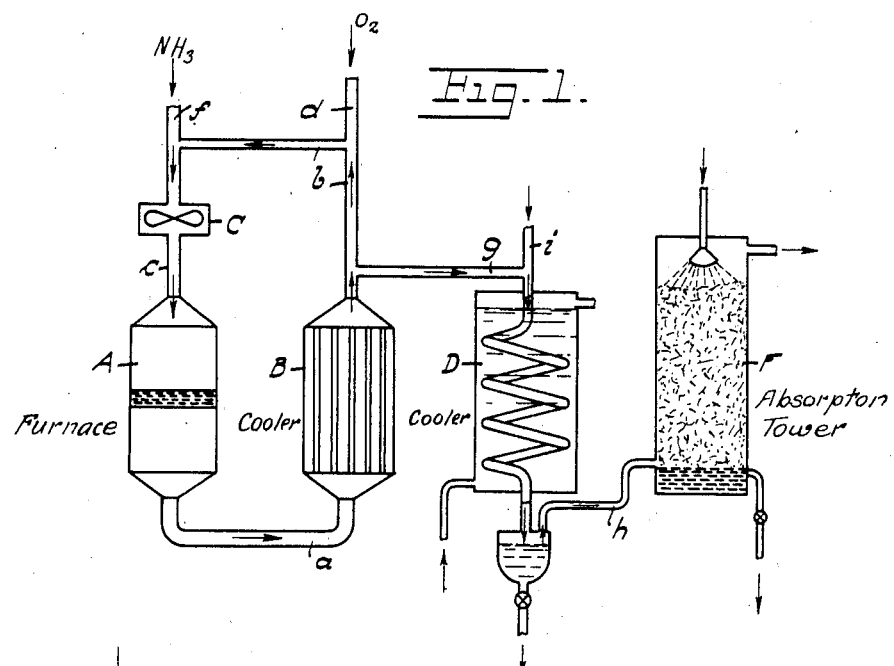
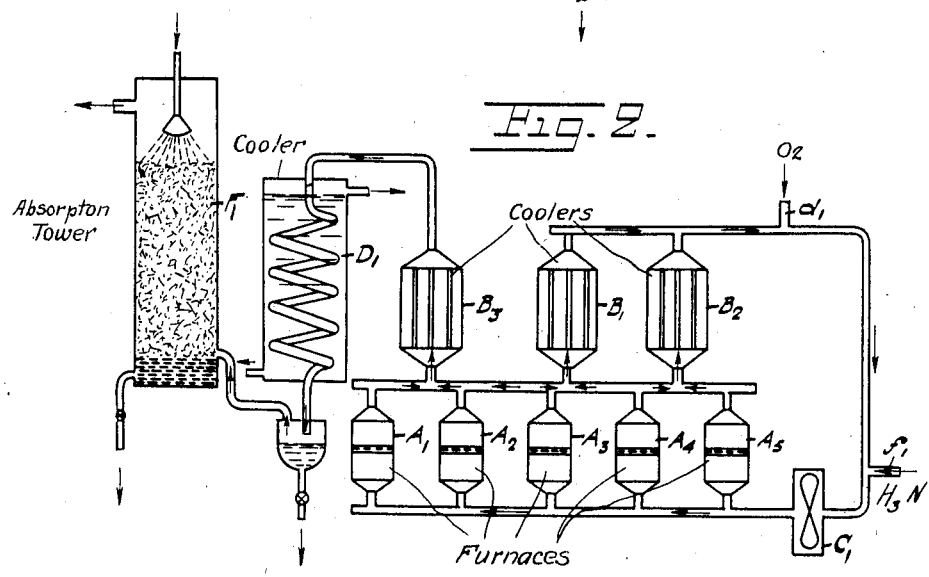

Patented Aug. 20, 1929.

1,725,462

UNITED STATES PATENT OFFICE.

FRANS GEORG LILJENROTH, OF STOCKHOLM, SWEDEN.

METHOD OF OXIDIZING AMMONIA.

Application filed January 11, 1926, Serial No. 80,545, and in Sweden January 30, 1925.

This invention relates to an improved process of oxidizing ammonia.

In oxidizing ammonia into nitric acid atmospheric air is usually used as oxidizing agent. Said method has the drawback that the nitric oxide primarily formed becomes highly diluted by the nitrogen of the air which makes it necessary to use large and expensive absorption systems for converting the nitric oxide into nitric acid and, furthermore, the nitric acid produced will be rather weak.

It has also been proposed to substitute air enriched with oxygen or even pure oxygen for the atmospheric air in such oxidizing process. This proposal is very attractive when the ammonia is produced by means of hydrogen which has been produced electrolytically inasmuch as in such case oxygen in large quantities is obtained without special cost and otherwise would be practically worthless. By such process a too large dilution of the nitric oxide formed by the atmospheric nitrogen is avoided, but on the other hand the drawback arises that the heat of reaction formed in oxidizing the ammonia into nitric oxide and water causes a very much greater rise of temperature in comparison with the use of atmospheric air, dependent thereon that the gas quantity present at the reaction is much smaller when the oxidation is carried out with the equivalent quantity of pure oxygen than if the same quantity of oxygen is accompanied by a four times greater quantity of nitrogen as is the case when atmospheric air is used. On account of the high temperature of reaction resulting in using pure or practically pure oxygen for the oxidation the speed of reaction is increased in such degree that the reaction takes place as an explosion and the method has, therefore, hitherto been unpracticable.

The above statements are easily understood from a comparison between the reaction conditions in using atmospheric air on the one hand and pure oxygen on the other hand in oxidizing ammonia. In the former case the reaction will be as follows:

1. $NH_3 + 2O_2 + 8N_2 = 1.5H_2O + NO + 0.75O_2 + 8N_2 + 52000$ cal.

In the latter case the reaction will be

2. $NH_3 + 2O_2 = 1.5H_2O + NO + 0.75O_2 + 52000$ cal.

In the former case the number of gas molecules will be 11.25 and as the molecular heat is about 7.5 the rise of temperature will be when 10% losses are assumed:

$$t_1 = \frac{52000 \times 0.9}{11.25 \times 7.5} = 560°C.$$

If the temperature of the incoming gas mixture is 20° C. the temperature in the catalyst (which in well-known manner can consist of a platinum wire net, platinum asbestos, iron oxide and so on) will be about 580° C. which temperature is sufficiently low for preventing an explosion-like progress of the reaction.

If on the other hand pure oxygen is used for the oxidation the number of gas molecules formed will be 3.25 only and the rise of temperature will therefore under the same suppositions be in the this case:

$$t_2 = \frac{52000 \times 0.9}{3.25 \times 7.5} = 1930°C.$$

and accordingly the temperature of the catalyst will be about 1950° C. At said high temperature the reaction would take place explosion-like, the catalyst would be destroyed and the nitric oxide formed be decomposed to an essential degree into free nitrogen and free oxygen. It is true that the said drawbacks can be avoided by using a large excess of oxygen but in such case it would not be possible to attain any advantages as to the size of the absorption system or the strength of the acid produced.

In my copending application Ser. No. 80,544, filed Jan. 11, 1926, I have described how the said drawbacks in using pure oxygen as oxidizing agent may be avoided by carrying out the oxidation stepwise while using intermediate cooling. Said method makes it possible to attain the advantages of using pure oxygen or gases rich in oxygen with the only drawback that the apparatus necessary for the performance of the method will be rather large and expensive inasmuch as it requires a plurality of oxidation furnaces with coolers.

The chief object of the present invention is to simplify the method in such manner that it can be carried out in a simple apparatus while using oxygen or gases rich in oxygen as oxidation agent and while avoiding that a too high reaction temperature arises or that the gas resulting from the reaction becomes too much diluted by inert gases which render the condensation of the nitric acid and the production of a strong acid difficult.

The invention consists, chiefly, in this that a part of the gas mixture obtained in the oxidation of the ammonia and consisting essentially of nitric oxide, steam and oxygen after cooling is used to dilute the mixture of ammonia and oxygen supplied in carrying out the reaction, the reaction temperature being in this manner reduced to a suitable value.

The method can for instance be carried out with a single furnace in such manner that only a part of the gas escaping from the reaction furnace is drawn off to an absorption system for its condensing into nitric acid while the remainder after cooling and addition of ammonia and oxygen in the proportions theoretically necessary for the reaction is returned to the reaction furnace in a continuous circulation. When a plurality of oxidation furnaces are used they may be connected in parallel in a circulation system analogous with the system having a single furnace, or the furnaces may be arranged in groups of which the first is supplied with ammonia and oxygen diluted with cooled reaction gas from the same or following furnaces, while the ammonia and the oxygen supplied to the second and following groups may be diluted with cooled reaction gases from the preceding furnaces. The mixture of the reaction gases which are used in the theoretical proportions for the oxidation of the ammonia into nitric oxide and water or into nitric acid is thus according to this inventon diluted wth rather cool gases of the same composition as those formed in the reaction and the excess of gases drawn off from the process delivers thus when cooled directly or after a suitable supply of oxygen nitric acid which on account of the absence of large quantities of inert gases can be condensed in a rather small condensing system and be obtained in a concentrated form. At the same time the dilution of the reacting gases makes it possible to limit the reaction temperature to a value at which losses on account of decomposition of the nitric oxide are practically avoided and the duration of the catalyst is not jeopardized by a too violent reaction. The regulating of the reaction temperature can be effected by regulating the quantity of the circulating gas in relation to the freshly supplied gas mixture, and, if desired, also by regulating the cooling of the circulating gases.

In the accompanying drawings I have shown diagrammatically in Figs. 1 and 2 two embodiments of apparatus adapted for the carrying out of the process.

Referring now to Fig. 1 of the drawings, A designates a furnace for oxidizing ammonia of any well-known design, B a cooler, for instance a steam generator, and C a ventilator or other circulating means, said apparatus being connected by means of pipes $a$, $b$, $c$, to form a circulation system. To the pipe $b$ supply pipes $d$ and $f$ for oxygen and ammonia respectively are connected and a branch pipe $g$ is provided for drawing off the gas excess in the circulation system to a cooler D of acid proof material. The cooler D is by means of a pipe $h$ connected to an absorption tower F for recovering the remaining nitric acid which is not condensed in the cooler D. The absorption tower F is, preferably, in well-known manner provided with a filling of acid-proof material over which water or weak nitric acid is caused to flow. The supply of ammonia and oxygen to the circulation system, preferably, takes place at different points as is indicated in Fig. 1 for preventing the formation of an explosive mixture of oxygen and ammonia. Between the supply pipes $d$ and $f$ a mixing chamber (not shown) can be provided, if desired, for intimately mixing the gas supplied at $d$ with the circulating gas mixture before the other gas component is added. The ventilator C is, preferably, provided between the supply pipes $d$ and $f$ but before the oxidation furnace so that it effects an intimate mixture of the gases before they enter the furnace A, so that the provision of a separate mixing chamber in this case may be dispensed with.

Through the pipe $a$, cooler B and pipe $b$ thus a gas mixture circulates which is of the same composition as the gas drawn off to the absorption system and which has been formed by the reaction between the ammonia and the oxygen freshly supplied through the pipes $d$ and $f$. Supposing that one volume of ammonia and 1.25 volumes of oxygen are supplied through the pipes $f$ and $d$ respectively in the unit of time the reaction takes place according to the formula:

$$NH_3 + 1.25O_2 = NO + 1.5H_2O + 52000 \text{ cal.}$$

If no gas were returned to the furnace from the circulation system the reaction would theoretically give a rise of temperature of

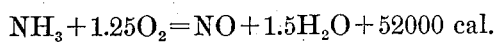
$$t_3 = \frac{52000 \times 0.9}{2.5 \times 7.5} = \sim 2500° \text{ C.}$$

At this temperature the reaction would take place explosion-like, the catalyzer material would be destroyed and a great percentage of the nitric oxide would be decomposed into free nitrogen and free oxygen. Said violent reaction is now according to this invention prevented by diluting the reacting gases before their supply to the oxidation furnace in a sufficient degree with the gas circulated in the circulation system and cooled in the cooler B. If the gas mixture $NH_3 + 1.25O_2$ is diluted for instance with three times as much of the circulating gas the rise of temperature in the oxidation furnace will evidently be only one fourth of that above calculated, viz about 625° C. The whole gas mixture $4NO+6H_2O$ leaving the reaction furnace is cooled down in the cooler for instance to 350° C. Then one fourth of the gas mixture is drawn off through the pipe $g$ to the absorption system while the remaining part continues the circulation through the pipe $b$ and receives a fresh addition of one volume of $NH_3$ and 1.25 volumes of $O_2$. If these freshly supplied gases have a temperature of about 20° C. the temperature of the gas mixture sinks so that it enters the furnace A with a temperature of about 275° C. The temperature of the catalyzer bed and of the gases escaping from the furnace will accordingly be 625+275=900° C. which temperature is sufficiently low for preventing the reaction from taking place explosion-like. The temperature can be further lowered by increasing the quantity of circulating gas in relation to the quantity of freshly supplied ammonia and oxygen. This can in the simplest way be effected by increasing the speed of the ventilator. By regulating said speed the temperature in the catalyzer bed can be regulated at will. The quantity of the circulating gas and the cooling thereof are, preferably, suited in such manner that the reaction temperature will not essentially exceed 1000° C. inasmuch as the losses on account of the decomposition of the nitric oxide increase rapidly at temperatures above 1000° C.

In the example above described it was supposed that only such quantity of oxygen was supplied that is necessary for the oxidation of the ammonia into nitric oxide and water. In such case an addition of oxygen must be made to gas drawn off to the absorption system for the production of nitric acid thereof, said addition being preferably made through a pipe $i$ before the entrance of the gas into the cooler D. The invention covers, however, of course, also the case that more oxygen than above was supposed is supplied to the ammonia oxidation system, for instance the whole quantity of oxygen that is necessary for the conversion of the ammonia into nitric acid, no addition of oxygen to the absorption system being in the latter case needed.

For utilizing the heat of the gas drawn off to the absorption system in the most economical manner an additional cooler in the form of a steam generator can be inserted in the pipe $g$ before the cooler D whereby it also will be possible to reduce the dimensions of the cooler D. By carrying out the cooler D with an effective cooling the nitric acid can be completely condensed in said cooler and the absorption tower F accordingly be dispensed with. It is not necessary to draw off the gas to the absorption system from a point after the cooler B but the gas can be drawn off through a branch pipe from the pipe $a$ in which case the two flows of gases are cooled each in one separate steam generator or other cooling device to the desired temperature.

In Fig. 2 I have shown an embodiment of a large plant with a plurality of ammonia oxidation furnaces $A_1$ $A_2$ $A_3$ $A_4$ and $A_5$. In this case the furnaces are, preferably, connected in parallel into the circulation system which further contains a ventilator $C_1$ common to all furnaces and a suitable number of coolers $B_1$ $B_2$ preferably carried out as steam generators. A separate cooler $B_3$ is provided before the cooler $D_1$ for cooling the gas led off to the absorption system $D_1$, $F_1$. The whole quantity of oxygen necessary for the reaction is supplied at $d_1$ and the ammonia at $f_1$. The mode of operation is essentially the same as above described with reference to Fig. 1.

In the examples above described it was supposed that the gas is circulated by means of a ventilator but the invention covers also such cases in which the gas is circulated in any other manner as for instance by injecting the oxygen or the ammonia or both through injectors.

It is not necessary to supply the ammonia in gaseous state inasmuch as it can be injected in anhydrous liquid state in the circulating gas, the liquid ammonia being immediately vaporized by the contact with the hot gases. If desired, the ammonia can also be supplied as an aqueous solution in which case the ammonia is driven out from the solution by means of the hot circulating gases according to well-known methods, for instance by leading the hot gases through the solution or through a tower apparatus in counter-current to the solution.

What I claim is:

1. The method of oxidizing ammonia, which comprises forming a gas mixture consisting essentially of ammonia and oxygen as active components and nitric oxide and steam as diluting components, and subsequently passing such mixture into contact with a heated catalyst.

2. The method of oxdizing ammonia, which comprises forming a gas mixture consisting essentially of ammonia and oxygen as active components and nitric oxide, steam and an excess of oxygen as diluting components, and subsequently passing such mixture into contact with a heated catalyst.

3. The method of producing nitric acid, which comprises forming a gas mixture consisting essentially of ammonia and oxygen as active components and nitric oxide and steam as diluting components, passing said mixture into contact with a heated catalyst, and condensing the resulting gas mixture to nitric acid.

4. The method of continuously producing nitric acid, which comprises forming a gas mixture consisting essentially of ammonia and oxygen as active components and nitric oxide and steam obtained by oxidizing ammonia as diluting components, passing such mixture into contact with a heated catalyst, condensing a portion of the nitric oxide with equivalent quantities of steam and oxygen to nitric acid, and utilizing the remainder as diluting means in continuing the process after cooling.

5. The method of continuously producing nitric acid which comprises supplying continuously a gas mixture consisting essentially of ammonia, oxygen, nitric oxide and steam to a series of ammonia oxidation furnaces, reacting upon the ammonia by means of the oxygen of said gas mixture, drawing off a portion of the gas mixture formed and condensing it to nitric acid, cooling the remainder without condensing the nitric oxide contained therein and utilizing said cooled gases to dilute the ammonia and oxygen freshly supplied.

6. The method of oxidizing ammonia, which comprises reacting upon ammonia by means of oxygen in presence of nitric oxide and steam as diluting agent, drawing off and cooling a portion of the gas mixture obtained, mixing said cooled portion of the gas mixture with ammonia and oxygen in subsequent operations, and continuing the reaction with the gas mixture thus formed.

7. The method of oxidizing ammonia by reacting upon the ammonia by means of oxygen in the presence of a catalyst, which comprises mixing the ammonia and the oxygen supplied with a cooled gas containing nitric oxide, and passing such mixture into contact with a heated catalyst, the quantity of such cooled gas and its temperature being so related to the quantities of ammonia and oxygen that the reaction temperature will not essentially exceed 1000° C.

In testimony whereof I have signed my name.

FRANS GEORG LILJENROTH.